United States Patent [19]

Schlaeger

[11] 3,957,285

[45] May 18, 1976

[54] DOUBLE SPRING CARGO TIE-DOWN

[75] Inventor: Gary D. Schlaeger, Columbia Heights, Minn.

[73] Assignee: Burlington Northern, Inc., St. Paul, Minn.

[22] Filed: Nov. 20, 1974

[21] Appl. No.: 525,559

[52] U.S. Cl. .............................. 280/179 A; 105/471
[51] Int. Cl.² .......................................... B60P 7/08
[58] Field of Search............... 280/179 A; 105/469, 105/470, 471, 472, 473; 267/70

[56] References Cited
UNITED STATES PATENTS

| 356,444 | 1/1887 | Brown | 267/70 |
| 1,008,771 | 11/1911 | Anderson | 267/70 |
| 3,430,981 | 3/1969 | Tarantola | 280/179 A |
| 3,804,028 | 4/1974 | O'Leary | 105/471 |

Primary Examiner—Robert R. Song
Attorney, Agent, or Firm—Merchant, Gould, Smith, Edell, Welter & Schmidt

[57] ABSTRACT

An improved tie-down accessory for use in securing loads to flatbed vehicles including a pair of resilient members arranged to minimize any unequal distribution of strain across a transverse steel tie-down band resulting from longitudinal shifting of the load.

4 Claims, 11 Drawing Figures

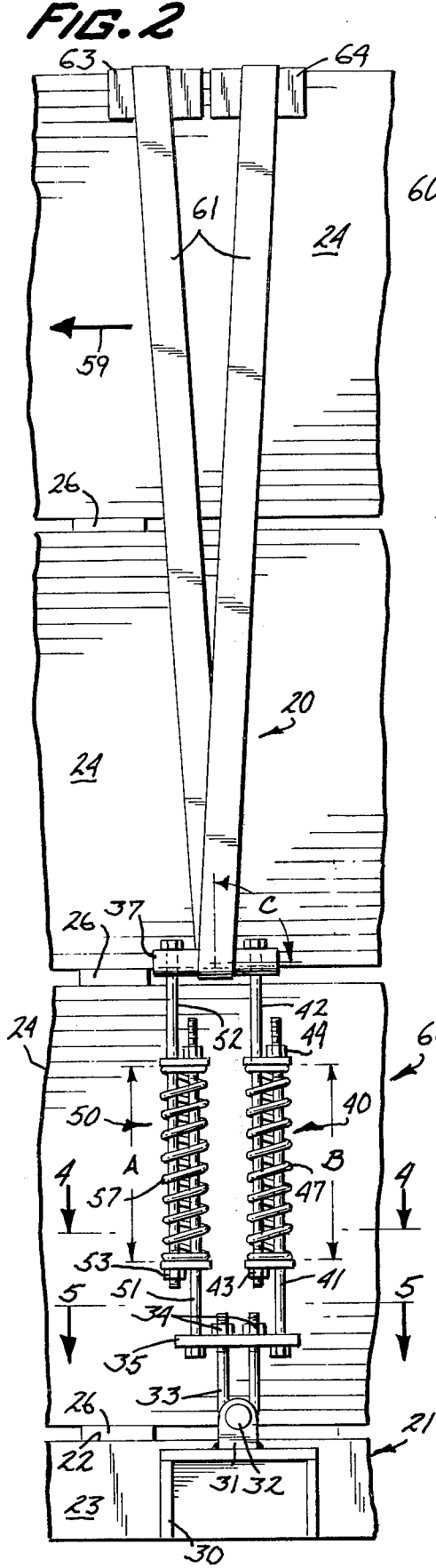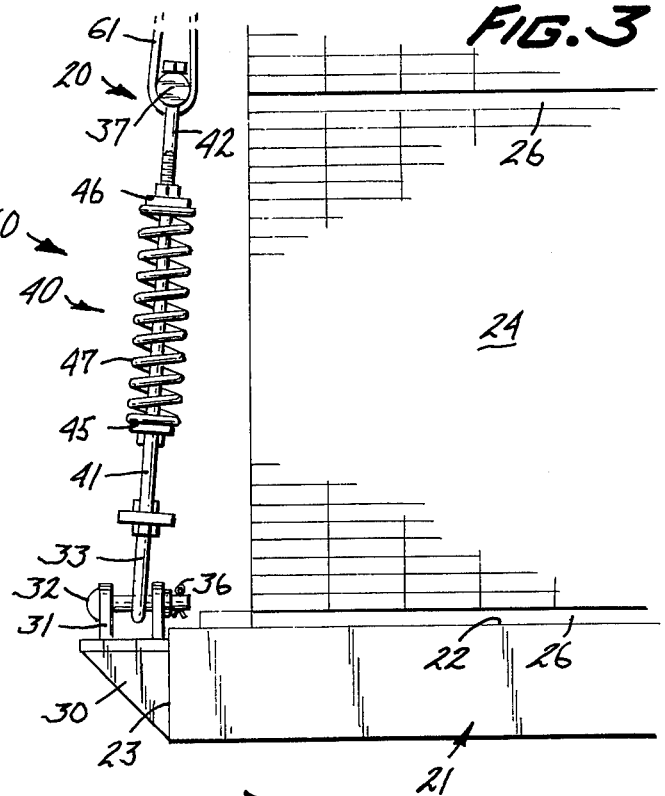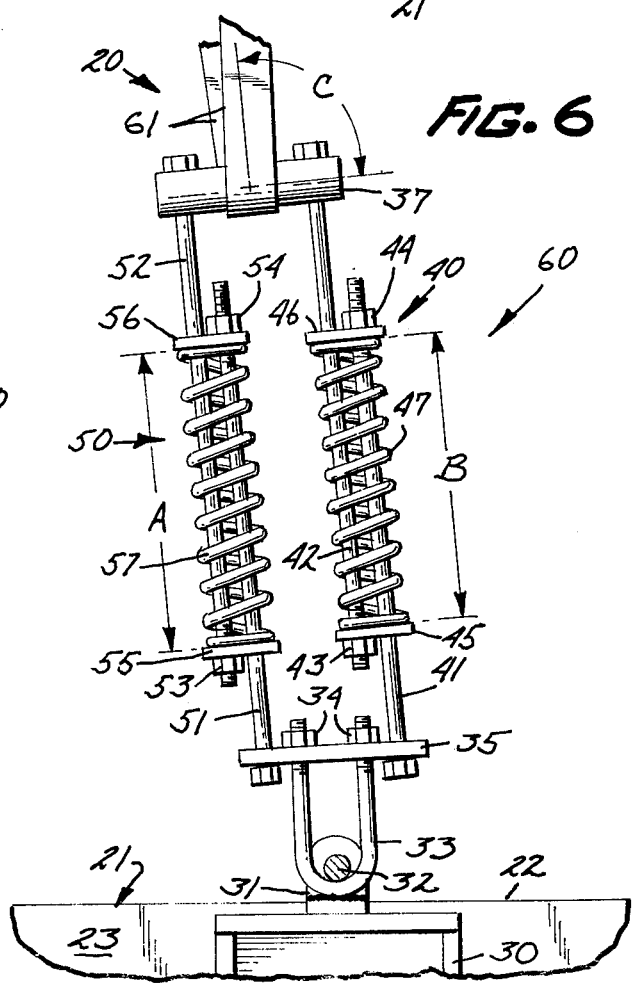

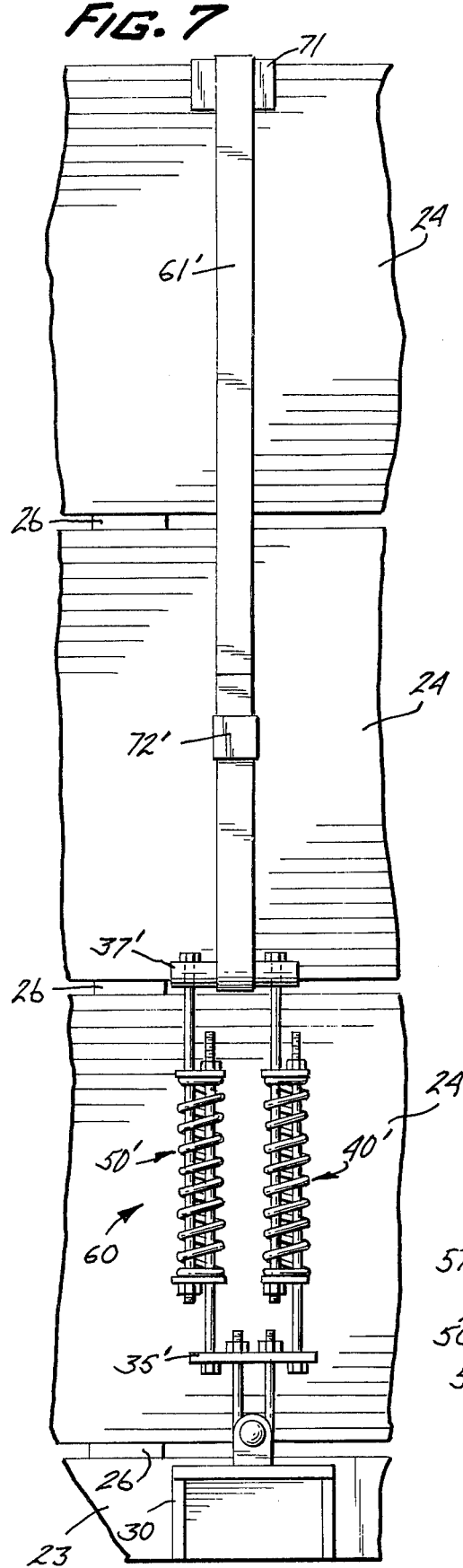
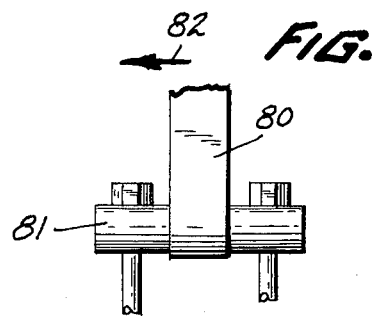
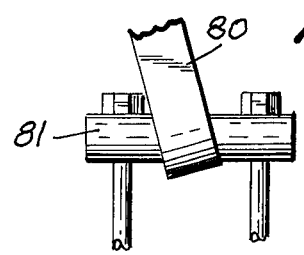
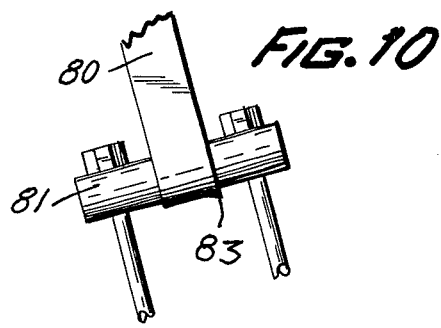
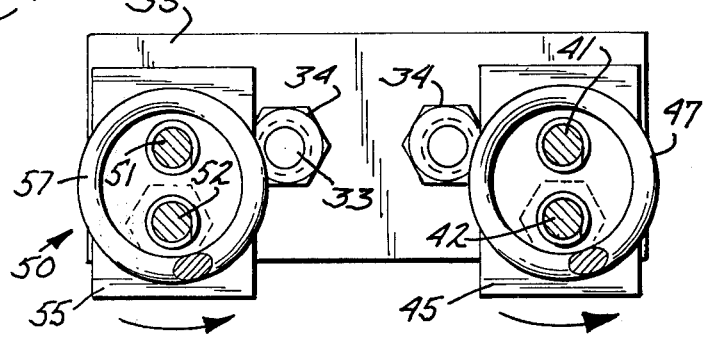

DOUBLE SPRING CARGO TIE-DOWN

BACKGROUND OF THE INVENTION

This invention relates to the field of transportation of goods, and more particularly to "tie-downs", or means for securing loads to the flatbeds of vehicles particularly such vehicles which do not have end bulkheads or other laterally extending restraining members against which the loads can be secured. The customary procedure involves passing chains, cables, ropes, steel bands, or other flexible equivalents, hereinafter referred to generally as "lashings", over the tops of the load elements and securing them to eyes, rings, clevises, or stake pockets with which the sides of the cars are equipped.

Little difficulty is encountered in restraining loads against vertical or transverse movement, but preventing longitudinal shift of loads is not easy, particularly for railroad vehicles where longitudinal impacts due to switching and transportation are numerous and severe. Provision of bulkheads at the ends of such cars offers a partial solution, and temporary cross members have also been proposed. The tremendous forces required to arrest the movement of a load of many tons, once it has begun to shift, make these expedients less than wholly satisfactory.

One factor that demands consideration in this connection is that many loads tend to compact or settle during transportation, so that an initially tight securing arrangement or "tie-down" gradually loosens. Recognition of this factor has led to the provision of resilient tie-down accessories through which the lashing materials can be passed at one or both sides of the car. If the lashing is secured under sufficient tension to strain the resilient accessory adequately, a considerable amount of load compaction can occur without undue loosening of the tie-down arrangement.

An increasingly popular lashing is steel strapping or banding. This material is available in widths between half an inch and three inches, the gauge of the metal naturally varying with its width. Banding is convenient to use, in appropriate sizes, and efficient instruments have been developed for securing it around a load under considerable tension. U.S. Pat. No. 3,678,866 to O'Leary et al. shows how banding can be used both to form material to be shipped into bundles for efficient handling, and to secure the bundles on the bed of a flat car. The tie-downs disclosed in that patent comprise steel bands passing at both sides of the car around the pins of clevises connected by spring assemblies and chains to the side sills. When the bands are tensioned to three thousand pounds, for example, an apparently very secure loading system results.

Experience has shown, however, that there is an undesireably high incidence of failures in tie-downs of this sort. The failures are observed to occur by tearing of the band material where is passes around the clevis pins.

SUMMARY OF THE INVENTION

I have discovered the cause for these failures, and have designed an improved tie-down system by which they can be minimized. When the high tension is applied to the prior art tie-down, its pivotal connection with the side sill is under such great stress that frictional forces between abutting surfaces become very large. Now when the load shifts forwardly for example so that banding is not perpendicular to the bed of the car, the clevis is frictionally prevented from pivoting to follow it, and all the stress in the band is applied at its rearward edge, the forward edge perhaps not even contacting the clevis pin at all, and a load which could well be resisted by the entire band is applied to a small part of its width. The stress in the band exceeds its strength, and the band begins to tear at the edge, the tear quickly propagating across the entire band.

I avert this failure by substituting for a single spring, in the resilient tie-down accessory, a pair of substantially parallel and identical springs, pivotally mounted side-by-side when viewed from the side of the car. These springs are connected to the ends of a short cylindrical cross member corresponding to a clevis pin, and the lashing band passes around the cross member and is tensioned. Now if the load shifts, forwardly for example, the cross member can tilt, differentially varying the spring compressions, while maintaining substantially the same overall tension, so that peak load concentration at an edge of the band is substantially diminished. This effect occurs automatically as rapidly as the load shift, and is not opposed by frictional forces between any links, eyes, pins, or similar interacting members.

It is accordingly a principal object of the invention to provide a new and improved snubber or tie-down arrangement. Another object is to provide a tie-down arrangement using steel bands in which tearing of the bands upon shifting of the tied-down load is greatly reduced. Another object is to provide a resilient tie-down component comprising a pair of substantially parallel and identical springs acting at opposite ends of a cylindrical cross member over the center of which a steel band is to pass, so that force applied by the band in a direction other than normal to the axis of the cross member results in differential straining of the springs. Another object is to provide a new process for transversely banding a load to a vehicle bed which includes the step of resiliently minimizing any unequal distribution of stress across the width of the band resulting from longitudinal shifting of the load.

Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing,

FIG. 2 is a side elevation of my invention in use;

FIG. 3 is a fragmentary view in the direction indicated by the arrow in FIG. 1;

FIG. 6 is a fragmentary view generally like FIG. 2, showing my invention after a load shift;

FIG. 7 is a view similar to FIG. 6 of my invention applied using a single band which passes over the load rather than the looped band of FIG. 2;

FIGS. 8, 9 and 10 are diagrammatic views illustrative of the operation of a prior art structure; and FIG. 11 is a view generally like FIG. 4 showing a feature of the invention.

DESCRIPTION OF THE PREFERRED EMBODIMENTS

Figure 1:
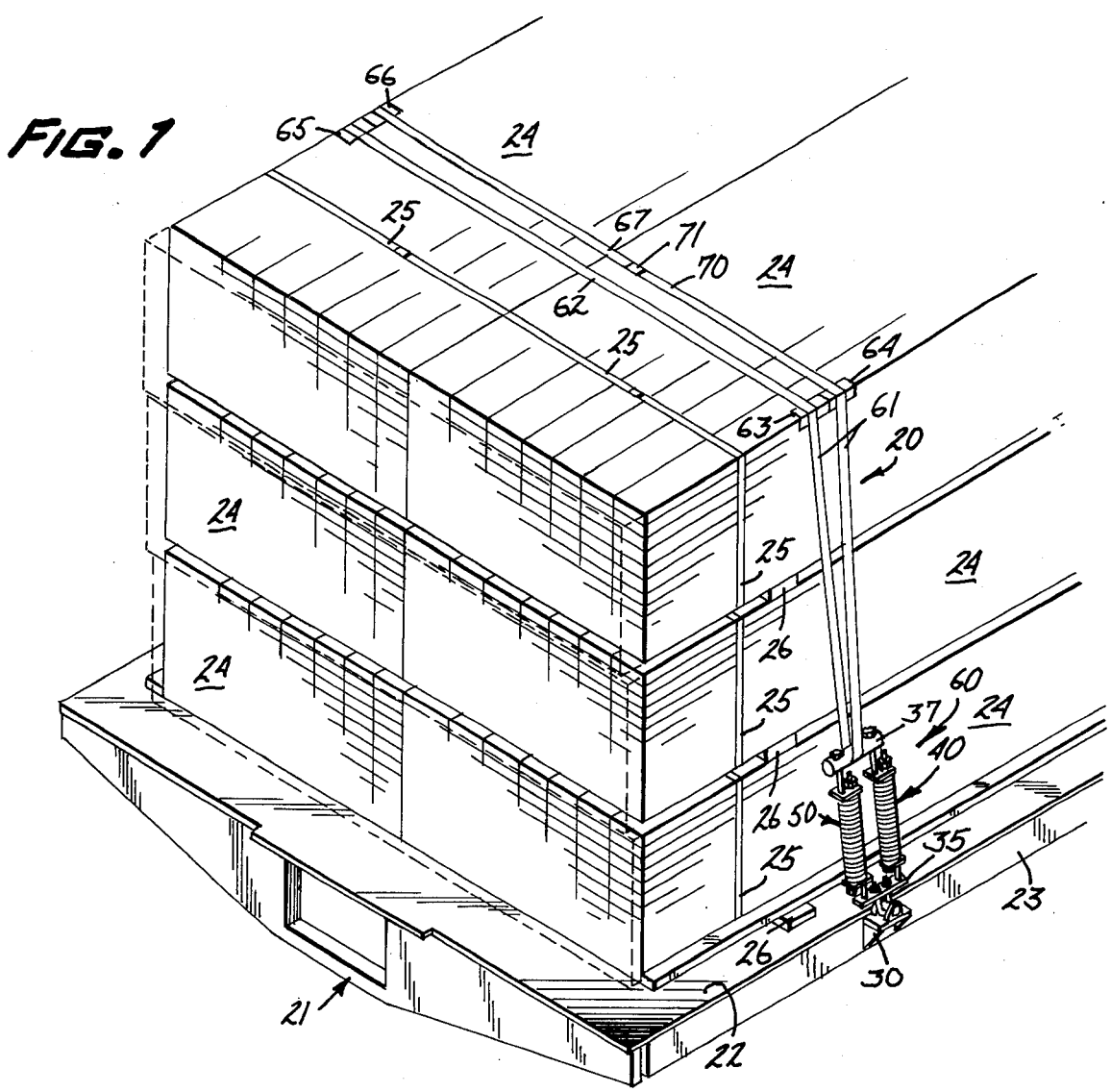
FIG. 1 is a fragmentary perspective view showing a flat car having a load secured to its deck by my invention.
Figure 4:
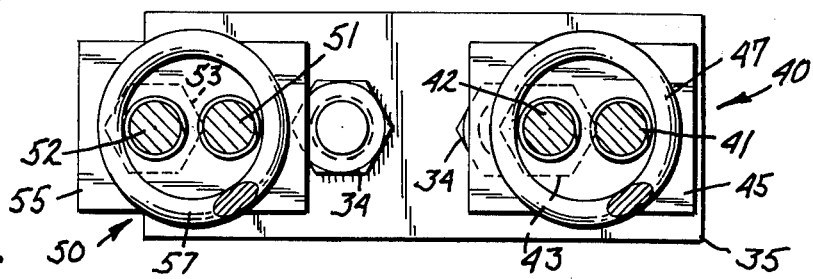
FIGS. 4 and 5 are sectional views taken along the lines 4—4 and 5—5 of FIG. 2.
Figure 5:
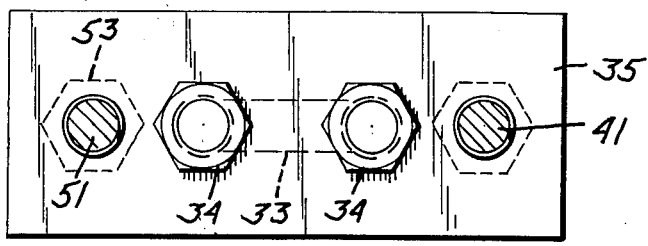

Referring now to FIGS. 1–5, a snubber or tie-down 20 accordingly to my invention is shown in use to secure one end of a load of lumber to a railroad flat car 21. The car has a flat bed 22 and side sills one of which is shown at 23. The lumber is prepared in the form of bundles 24 secured by banding 25, the bundles being mounted on and separated by transverse support members 26.

A bracket 30 is shown as secured to side sill 23 and carries a clevis 31 positioned with its pin 32 extending transversely of the car. A symmetrical U-bolt 33 engages pin 32, and is secured by nuts 34 to a tie bar 35, which accordingly extends longitudinally of the car and pivots about a transverse axis. Pin 32 may be secured as by a cotter key 36.

Each end of tie bar 35 is connected to one end of the cross member 37 by a spring assembly. The spring assembly 40 includes a pair of long bolts 41 and 42, a pair of nuts 43 and 44, a pair of bearing plates 45 and 46, and a compression spring 47, and spring assembly 50 includes a pair of long bolts 51 and 52, a pair of nuts 53 and 54, a pair of bearing plates 55 and 56, and a compression spring 57.

Within fairly rough manufacturing limits, springs 47 and 57 are identical in dimensions, spring rates, and so forth. Bolts 41, 42, 51 and 52 are also substantially identical. Nuts 43 and 53 are equally threaded on bolts 42 and 52, nuts 44 and 54 are equally threaded on bolts 41 and 51, and nuts 34 are equally threaded on the legs of U-bolt 33.

It will be noted that bolts 41 and 42 pass through spring 47 in opposite directions, and that bolts 51 and 52 pass through spring 57 in opposite directions. Thus if upward force is applied to cross member 37, springs 47 and 57 are strained in compression. Elements 33–57 comprise a resilient tie-down accessory 60 which by design is constructed from parts readily available in every railway repair shop for ease in servicing and upkeep anywhere in the country. Nuts 34, 43, 44, 53 and 54 are preferably tack welded or otherwise secured in position so that there is no danger of the accessory becoming disassembled in use.

The accessory is quite free to adapt itself to varying conditions. For example, if the arrow 59 in FIG. 2 indicates the forward direction, bolt 52 is forward of bolt 51 and bolt 42 is forward of bolt 41, see FIG. 4, and their axes are substantially coplanar. However, plate 45 is free to rotate about bolt 41 and plate 55 is free to rotate about bolt 51, provided these rotations are in the same direction, so that bolts 42 and 52 may be outboard of bolts 41 and 51, as shown in FIG. 11, or may be behind or inboard thereof. By way of example the total length of accessory 60 in one embodiment was about 18 inches, and springs 47 and 57 were about 10 inches long with the rate of 200 pounds per inch. Cross member 37 was one and one quarter inch round steel, and the spacing between bolts 42 and 52 was sufficient to accommodate three inch steel banding.

A "load line" may be considered to pass from the center of member 37 to the axis of clevis pin 32. If upward force perpendicular to the axis of member 37 at its center is applied, and the elements of the accessory are positioned as shown in FIG. 11, springs 47 and 57 are equally compressed. If the force is applied off center, or at an angle other than 90 degrees, one spring may be compressed differentially with respect to the other. If the elements are positioned as shown in FIG. 2 and a force perpendicular to the axis of member 37 at its center is applied, the slight displacement between the centers of members 35 and 37 results in slight differential compression of one spring with respect to the other. As long as U-bolt 33 is free to pivot about the center of clevis pin 32, by circumferential sliding, the differential compression is largely removed by this pivotal movement, which slightly modifies the parallelogram of acting forces.

The force to which accessory 60 is subjected is applied by a steel band passing around cross member 37 and over the load. In FIG. 1 the band 61 takes the form of a loop having its center 62 at the top of the load, with one end passing down over a pad 63, outwardly around member 37, upward over a second pad 64 toward the center top of the load. The other end is similarly passed over a pad 65, down to the cross member of a second accessory or a similar member rigidly fixed to the car, back up over a further pad 66, and again toward the center of the load. The band is tensioned in conventional manual or pneumatic means and the ends 67 and 70 are secured together by a clip 71 or other suitable arrangement. It will be evident that while the inner and outer portions of band 61 approach member 37 from slightly forward and slightly rearward, the angles are approximately equal and there is an area in which the band is truly in the relation to member 37 of two concentric mutually tangent cylinders.

In FIG. 7 the band 61' is not a loop but rather a single length of material terminating at each side of the car. At least one such termination includes an accessory 60. The band 61' passes over a pad 71 outwardly around member 37', and its end is secured to the main part by a clip 72'. The other end of the band is similarly secured to an accessory cross member 37 or its equivalent on the other side of the car. If only one resilient accessory is used per tie-down, the connection thereto is made last, tension being applied in the band as before.

As pointed out in the O'Leary et al. patent referred to previously, tensions to about three thousand pounds are useable in applying material tie-downs of this type. Under such severe forces the friction between U-bolt 33 and clevis pin 32 of FIG. 2, for example, becomes very great, and pivotal movement therebetween of the sort which was mentioned earlier as neutralizing any initial differential compression of springs 47 and 57 occurs only with great difficulty. However the accessory is in no way damaged by such differential compressions, which may further be modified as the load compacts. Severe vibrations will, of course, assist in the removal of such differential compressions.

Thus, even though a single occurence of the shift illustrated in FIGS. 8, 9 and 10 may not immediately cause band failure, a repetition of these occurrences, in the same or opposite senses, can result in stress fatigue of the tie-down bands, leading to ultimate failure which endangers the integrity and safety of the load.

The high friction between U-bolt 33 and clevis pin 32 does however have a deleterious effect which my invention is designed to eliminate. FIGS. 8, 9 and 10 are highly schematic showings to illustrate this point. FIG.

8 shows a single band 80 acting perpendicularly on a cylindrical member 81 which may for example be a clevis pin to which a single spring is secured as in O'-Leary et al. The strain in band 80 is uniform across its width. Now suppose that under a longitudinal impact the load shifts in the direction of the arrow 82 in FIG. 8, and that by reason of great friction, or some other constraint, member 81 is maintained in its FIG. 8 position. The result, exaggerated in FIG. 9, is that band 80 no longer contacts member 81 throughout its entire width, but only at the rearward edge 83 thereof. Even if the tension in the band did not change (which it does due to the changed geometry accompanying the load shift) that tension is now applied to only a relatively small area of the band and hence the force per unit area is multiplied by a sizeable factor. If the band is already stressed near its elastic limit, it tears. If the band is able to resist tearing, vibration may ultimately allow the member 81 to pivot to a new position as shown in FIG. 10, in which more complete contact between it and the band is restored, but the edge 83 of the band may still have been stretched so that now it is not receiving any of the force in the band.

I attribute the improved operation of my double spring resilient accessory to the fact that when a situation such as that in FIG. 9 is approached, differential compression of spring 57 more than spring 47 allows member 37 to reach a FIG. 10 position regardless of whether U-bolt 33 can pivot on pin 32. This is illustrated in FIG. 6, where it is to be seen that differential compression of springs 47 and 57 has allowed the axis of member 37 to move out of parallelism with tie bar 35, so that the original contact relation between the band and the cross member is substantially maintained.

Numerous objects and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim as my invention:

1. In combination:

a cross member having a longitudinal axis and a medial strap-engaging surface which is cylindrical about said axis;

a tie bar having a medial connection for pivotal movement about an axis generally orthogonal to the axis of said cross member at the center thereof;

first and second resilient members connecting said cross member to said bar at points oppositely spaced from the centers thereof;

together with a vehicle having a flat bed;

means mounted at the edge of said bed to provide a transverse pivot for said tie bar;

and tensioned strap means passing around said member to stress said resilient means.

2. In combination:

a vehicle having a flat bed;

means mounted along the edges of said bed at mutually opposite points to provide transverse pivots;

a pair of devices according to claim 1 having their medial connections engaging said pivots;

and tensioned strap means passing around the strap engaging surfaces of said members to stress said resilient means.

3. Apparatus according to claim 2 in which said vehicle is laden and said strap means passes over the lading to hold it in place, whereby rapid shifting of the lading and strap means along the vehicle produces temporary changes in the stresses acting in said resilient means.

4. In combination:

a cross member having a longitudinal axis and a medial strap-engaging surface which is cylindrical about said axis;

a tie bar having a medial connection for pivotal movement about an axis generally orthogonal to the axis of said cross member at the center thereof;

first and second resilient members connecting said cross member to said bar at points oppositely spaced from the centers thereof, said resilient members having axes which are substantially parallel to a load line, passing medially through said surface and intersecting said axis of said pivotal movement;

and means for varying the angle between the axis of said cross member and the load line.

* * * * *